US009557795B1

(12) United States Patent
Sabih et al.

(10) Patent No.: US 9,557,795 B1
(45) Date of Patent: Jan. 31, 2017

(54) MULTIPROCESSOR SYSTEM WITH PERFORMANCE CONTROL BASED ON INPUT AND OUTPUT DATA RATES

(75) Inventors: Sabih Sabih, Austin, TX (US); Sundararajarao Mohan, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 1704 days.

(21) Appl. No.: 12/565,138

(22) Filed: Sep. 23, 2009

(51) Int. Cl.
*G06F 1/32* (2006.01)
*G06F 9/38* (2006.01)
*G06F 9/50* (2006.01)

(52) U.S. Cl.
CPC ............ *G06F 1/3206* (2013.01); *G06F 1/3237* (2013.01); *G06F 1/3287* (2013.01); *G06F 9/3885* (2013.01); *G06F 9/5027* (2013.01)

(58) Field of Classification Search
CPC .... G06F 1/3206; G06F 1/3237; G06F 1/3287; G06F 9/3885; G06F 9/5027
See application file for complete search history.

(56) References Cited

U.S. PATENT DOCUMENTS

| 6,574,739 | B1* | 6/2003 | Kung et al. | 713/322 |
|---|---|---|---|---|
| 6,625,656 | B2* | 9/2003 | Goldhor et al. | 709/231 |
| 6,859,886 | B1* | 2/2005 | Johnson | 713/600 |
| 6,901,522 | B2* | 5/2005 | Buch | 713/320 |
| 7,017,060 | B2* | 3/2006 | Therien et al. | 713/323 |
| 7,124,245 | B1* | 10/2006 | Walton et al. | 711/113 |
| 7,536,461 | B2* | 5/2009 | Stecher et al. | 709/226 |
| 7,774,631 | B1* | 8/2010 | Walton | 713/321 |
| 2003/0005028 | A1* | 1/2003 | Dritschler et al. | 709/104 |
| 2009/0309243 | A1* | 12/2009 | Carmack et al. | 257/798 |
| 2010/0049963 | A1* | 2/2010 | Bell et al. | 713/100 |
| 2010/0332869 | A1* | 12/2010 | Hsin et al. | 713/320 |

OTHER PUBLICATIONS

Benini et al., "A Survey of Design Techniques for System-Level Dynamic Power Management", IEEE, Jun. 2000, pp. 299-316.*
Perera, Lloyd R., "eServer i5 Uncapped Partition CPU Utilization & Queuing," Jun. 10, 2005, pp. 1-11, IBM Corporation, Rochester, Minnesota, USA.

* cited by examiner

*Primary Examiner* — David J Huisman
(74) *Attorney, Agent, or Firm* — W. Eric Webostad; LeRoy D. Maunu

(57) ABSTRACT

A multi-processor system with dynamic power optimization for an integrated circuit and methods thereof are described. An input rate control signal is generated responsive to at least one input data stream. An output rate control signal is generated responsive to an output of the plurality of processors. The input rate control signal and the output rate control signal are monitored. The at least one input data stream is partitioned in response to the input rate control signal. The partitioned data is distributed to at least a portion of the plurality of processors. The plurality of processors is operated in a plurality of modes responsive to the monitoring.

17 Claims, 3 Drawing Sheets

MULTIPROCESSOR SYSTEM WITH PERFORMANCE CONTROL BASED ON INPUT AND OUTPUT DATA RATES

FIELD OF THE INVENTION

The invention relates to integrated circuit devices ("ICs"). More particularly, the invention relates to a multi-processor system with dynamic power optimization for an IC.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As demand for processing data expands, the demand for throughput expands. In order to accommodate an increased throughput, more than one high-speed serial interface may be used, and several serial data streams may be converted to parallel form for parallel data processing. Parallel data processing may be used to address the expanding need for increased bandwidth and throughput.

FPGAs are well positioned for parallel data processing. FPGAs may have multiple processors, such as multiple embedded DSPs, multiple embedded microprocessors, or multiple processors instantiated in field programmable logic gates ("FPGA fabric"), or a combination thereof, along with having multiple high-speed serial interfaces.

While there may be times, such as during high usage intervals, where parallel data processing may be useful, there also may be times when having so many resources committed to parallel data processing may not be as useful due to power utilization.

Accordingly, it would be useful to provide a multi-processor system that dynamically adjusts performance for power reduction.

SUMMARY

One or more aspects generally relate a multi-processor system with dynamic power optimization or conservation for an integrated circuit device ("IC").

An embodiment relates generally to a method of operating an integrated circuit having a plurality of processors. An input rate control signal is generated responsive to at least one input data stream. An output rate control signal is generated responsive to an output of the plurality of processors. The input rate control signal and the output rate control signal are monitored. The at least one input data stream is partitioned in response to the input rate control signal. The partitioned data is distributed to at least a portion of the plurality of processors. The plurality of processors is operated in a plurality of modes responsive to the monitoring.

In this embodiment, the plurality of modes may include a first mode and a second mode; a subset of the plurality of processors may be operated at a full rate responsive to the first mode; and at least one processor of the plurality of processors may be operated in an idle mode responsive to the second mode. The operating of the at least one processor in the idle mode may include gating a clock input. The operating of the plurality of processors may include dynamically adjusting performance of the plurality of processors. The generating of the output rate control signal may be responsive to a predetermined configuration of the integrated circuit. The plurality of processors may be instantiated in programmable logic fabric. The operating of the plurality of processors may include operating a first portion of the plurality of processors for processing the at least one input data stream and operating a second portion of the plurality of processors in an idle mode.

Another embodiment relates generally to a multi-processor system with a plurality of processors. A first circuit is coupled to at least one interface, and a second circuit is coupled to the plurality of processors. An analyzer circuit is coupled to the first circuit and the second circuit, and configured to determine an input data rate received by the first circuit. The second circuit is coupled to receive data from the first circuit and a control signal from the analyzer circuit. The second circuit is configured to provide partitioned data distributed to a first portion of the plurality of processors responsive to the control signal.

In this embodiment, the second circuit may include a configurable interface coupled to the plurality of processors; the configurable interface may distribute the partitioned data to the first portion of the plurality of processors responsive to the control signal; and a second portion of the plurality of processors may be in an idle mode. The second circuit may be configurable to operate the plurality of processors in a first mode and a second mode in response to the control signal. The first mode may operate the first portion of the plurality of processors at full rate. The second mode may operate at least one processor of the plurality of processors in an idle mode. The plurality of processors may be a plurality of configurable processors instantiated in programmable logic fabric. A third circuit may be coupled to an output of the plurality of processors, wherein the third circuit may be configured to determine data throughput of the plurality of processors and generate a control signal and wherein the second circuit may be coupled to receive the control signal of the third circuit. The second circuit may partition and distribute the partitioned data to at least the first portion of the plurality of processors in response to the control signal of the analyzer circuit and the control signal of the third circuit. Operating the at least one processor in the second mode may include reducing frequency rate. Operating the at least one processor in the second mode may include gating a clock input. Operating the at least one processor in the second mode may include powering off a portion of the at least one processor.

Yet another embodiment relates generally to an integrated circuit with a plurality of shared processors. A first interface has outputs coupled to the plurality of shared processors. A second interface is coupled to receive outputs of the plurality of shared processors. A third interface is coupled to receive at least one input data stream and provide an output coupled to a controller circuit. An input data analyzer circuit has an input coupled to the third interface and an output coupled to the controller circuit. The controller circuit is configured to partition the output of the third interface responsive to the output of the input data analyzer. A number of data partitions of the partitioned output of the controller circuit do not exceed a number of available processors of the plurality of shared processors.

In this embodiment, the controller circuit may be configurable to operate the plurality of shared processors in a first mode and a second mode in response to the output of the analyzer circuit; the first mode may be for operating a first portion of the plurality of shared processors at full rate; and the second mode may be for operating at least one processor of the plurality of shared processors in an idle mode. Operating of the at least one processor in the second mode may include gating a clock input. An output data analyzer circuit may be coupled to receive an output from the second interface and provide a control signal coupled to the input data analyzer circuit and the controller circuit. The controller circuit may be configured to partition and operate the plurality of shared processors in response to outputs of the input data analyzer circuit and the output data analyzer circuit.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
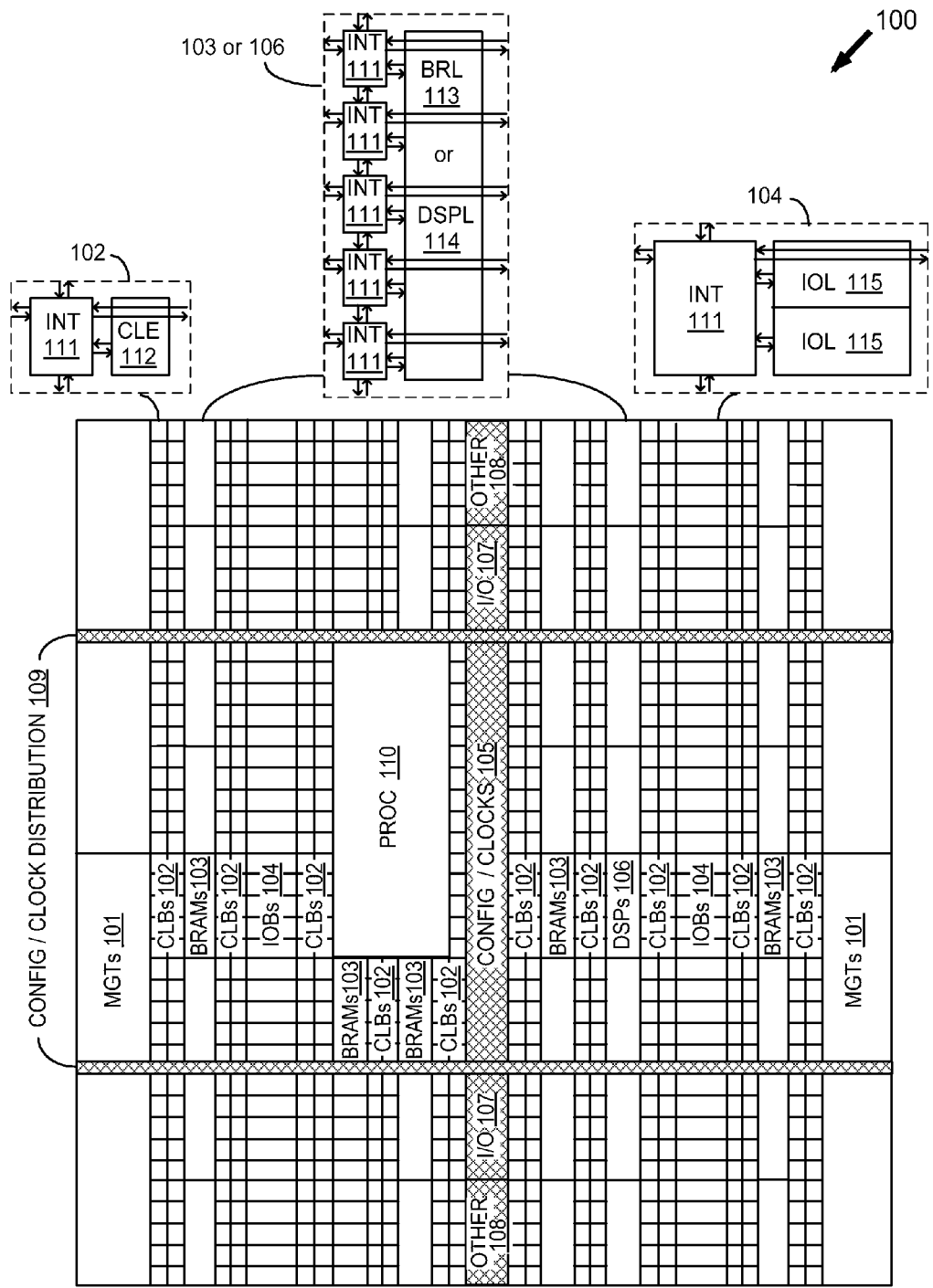
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
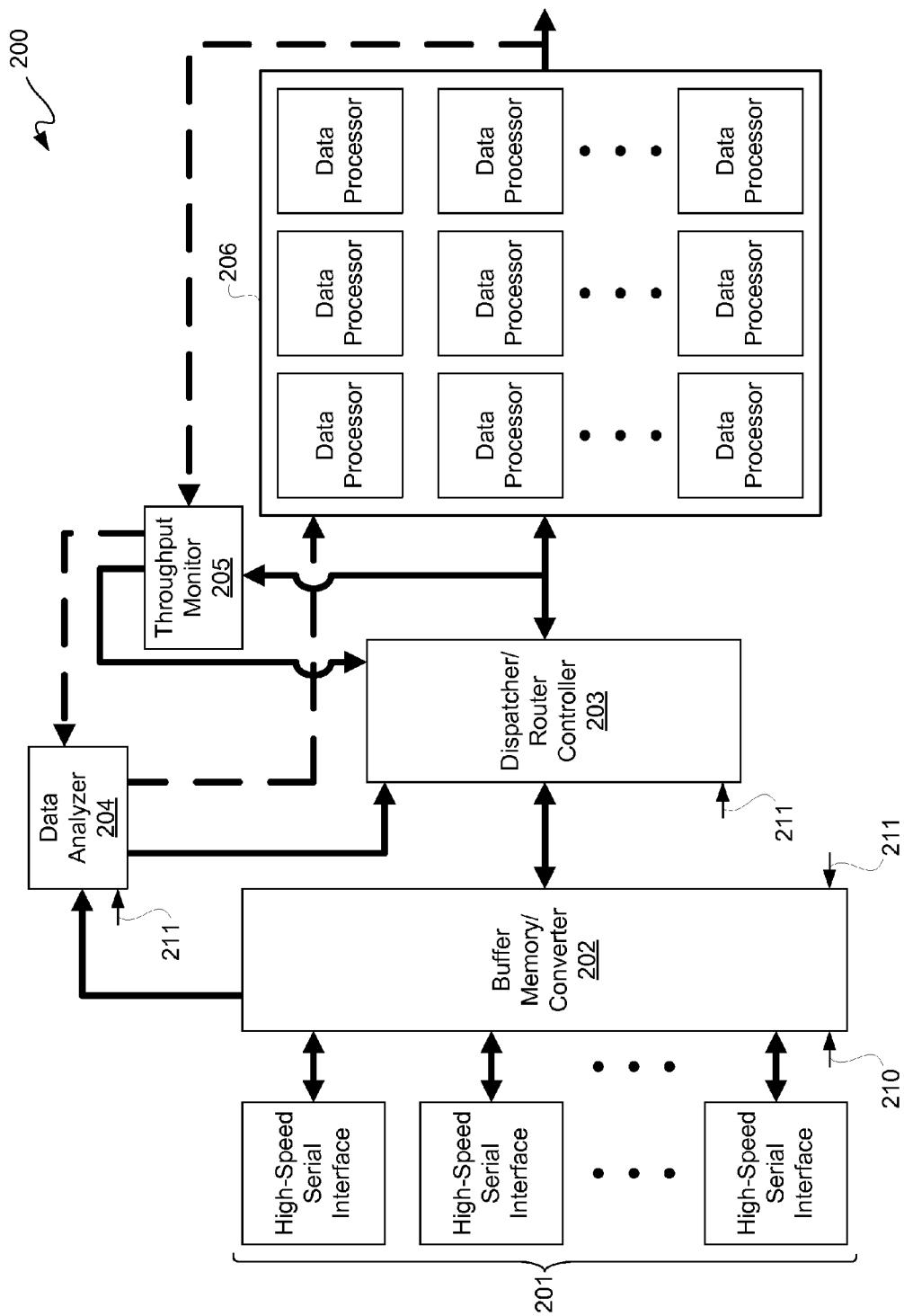
FIG. 2 is a block diagram depicting an exemplary embodiment of a multi-processor system.

FIG. 2 is a block diagram depicting an exemplary embodiment of a multi-processor system 200. Multi-processor system 200 may be implemented in a single IC. An example of such an IC may be an FPGA, such as FPGA 100 of FIG. 1; however, it should be appreciated that any of a variety of types of "system-on-a-chip" ICs may be used to implement multi-processor system 200.

Multi-processor system 200 includes one or more high-speed serial interfaces 201, buffer memory/converter 202, dispatcher/router controller 203, data analyzer 204, throughput monitor 205, and data processors 206. Data processors 206 may be an array of DSPs 106 of FIG. 1. Alternatively, data processors 206 may be an array of embedded microprocessors, or microprocessors or microcontrollers instantiated in FPGA fabric, or a combination thereof. Examples of such microprocessors capable of being instantiated in FPGA fabric include either or both PicoBlaze or MicroBlaze processors, available from Xilinx, Inc. of San Jose, Calif.

Data processors 206 are a pool of shared or sharable processors for performing a task. Accordingly, data obtained via high-speed serial interfaces 201 may be processed by one or more of data processors 206.

Data, such as by at least one input data stream, received via high-speed serial interfaces 201 is provided to buffer memory/converter 202 at a first data rate which is significantly higher than the rate at which an individual data processor of data processors 206 is capable of processing information. For example, serial data may be received at a rate which is in the gigahertz range, whereas a data processor of data processors 206 may operate in the megahertz range. By way of example and not limitation, data may arrive serially at a rate of approximately one to six gigahertz via a high-speed serial interface of high-speed serial interfaces 201, and a data processor of data processors 206 may operate in a range of approximately 100 to 200 megahertz.

Data arriving serially via one or more high-speed serial interfaces 201 is provided to buffer memory/converter 202. Hereafter, buffer memory/converter 202 is referred to as converter 202. Converter 202 stores data received from interfaces 201 and includes a serial-to-parallel converter to convert such data from a serial format to a parallel format. Such data may be clocked into converter 202 responsive to a clock signal 210 and clocked out of converter 202 responsive to a clock signal 211, where the frequency of the clock signal 211 is a fraction of the frequency of the clock signal 210. Alternatively, a high-speed link may be coupled to multiple low-speed links. The high-speed link may, but does not have to, be a high-speed serial link. For example, the high-speed link may be a relatively fast 8-bit wide interface/bus that is converted by converter 202 to a slower 64-bit interface/bus. These particular numerical examples are used for purposes of clarity and not limitation, as other numerical values may be used.

Coupled to converter 202 is dispatcher/router controller 203, referred to hereinafter as controller 203. Controller 203 may include data analyzer 204. For purposes of clarity and not limitation, data analyzer 204 is illustratively shown as a separate block from controller 203.

Data analyzer 204 is coupled to converter 202 to determine an input data rate in which data is being received from high-speed serial interfaces 201. It should be understood that the incoming data rate is the collective data rate of any and all high-speed serial interfaces of high-speed serial interfaces 201 actively receiving data.

Data analyzer 204 may be configured to monitor the status of converter 202 in terms of data capacity, namely whether converter 202 is full, empty, becoming full, becoming empty, or the like. Data analyzer 204 may have multiple programmable thresholds for performance level. These thresholds may be stored in converter 202, or directly registered with data analyzer 204. With respect to converter 202, it should be understood that the buffer may be a FIFO buffer for clocking in at one rate and clocking out at another rate; however, it should be appreciated that other known types of buffer memory may be used, including without limitation RAM. Responsive to data analyzer 204 detecting a flag set by converter 202, an action may be taken such as, for example, activating or disabling one or more of data processors of data processors 206 or throttling up or down the operating frequency of one or more of such data processors, or a combination thereof.

Data analyzer 204 may be configured to determine an average data rate for incoming data. Data analyzer 204 may provide an indication of the average data rate, such as via a control signal, to controller 203.

Controller 203, which may be clocked responsive to clock signal 211, may request data to be sent to it from converter 202 by asserting a read signal. Such read signal may be used to obtain data in parallel from converter 202. Controller 203 may be configured to break up data packets or other groups of data into smaller portions or groups for routing to one or more of data processors of data processors 206. Controller 203 is configured to track which of data processors 206 are active or inactive. Thus, portions of packets may be routed to those active processors of data processors 206. Because controller 203 is configured to track how many of data processors of data processors 206 are active or inactive, controller 203 effectively knows the amount of information handling capacity or performance level for data processors 206.

Converter 202, or data analyzer 204, may be coupled, such as via a write/load interface or via a serial interface of serial interfaces 201, to receive one or more thresholds for defining an acceptance range for data processors 206. The acceptance range may be an acceptable performance range defined between a minimum performance level and a maximum performance level. For example, a minimum performance level may be the lowest data throughput rate specified for an application, and a maximum performance level may be the highest data throughput rate specified for such application. Of course, such performance levels may vary from application-to-application. For purposes of clarity and not limitation, it shall be assumed that converter 202 receives an acceptance range.

Controller 203 may have access to the acceptance range in converter 202. Clock signal 211 may be provided to controller 203, and gating logic in controller 203 may be used to provide from controller 203 a gated clock signal to clock data processors of data processors 206. In response to an indication from data analyzer 204 indicating a current incoming data rate or a moving average of incoming data, controller 203, having tracked the current performance level of data processors 206, may invoke either a power saving mode or a performance enhancing mode, as described below in additional detail, or may maintain the status quo for a current operational level of processor array 206. Optionally, throughput monitor 205 may be used as described below in additional detail.

Figure 3:
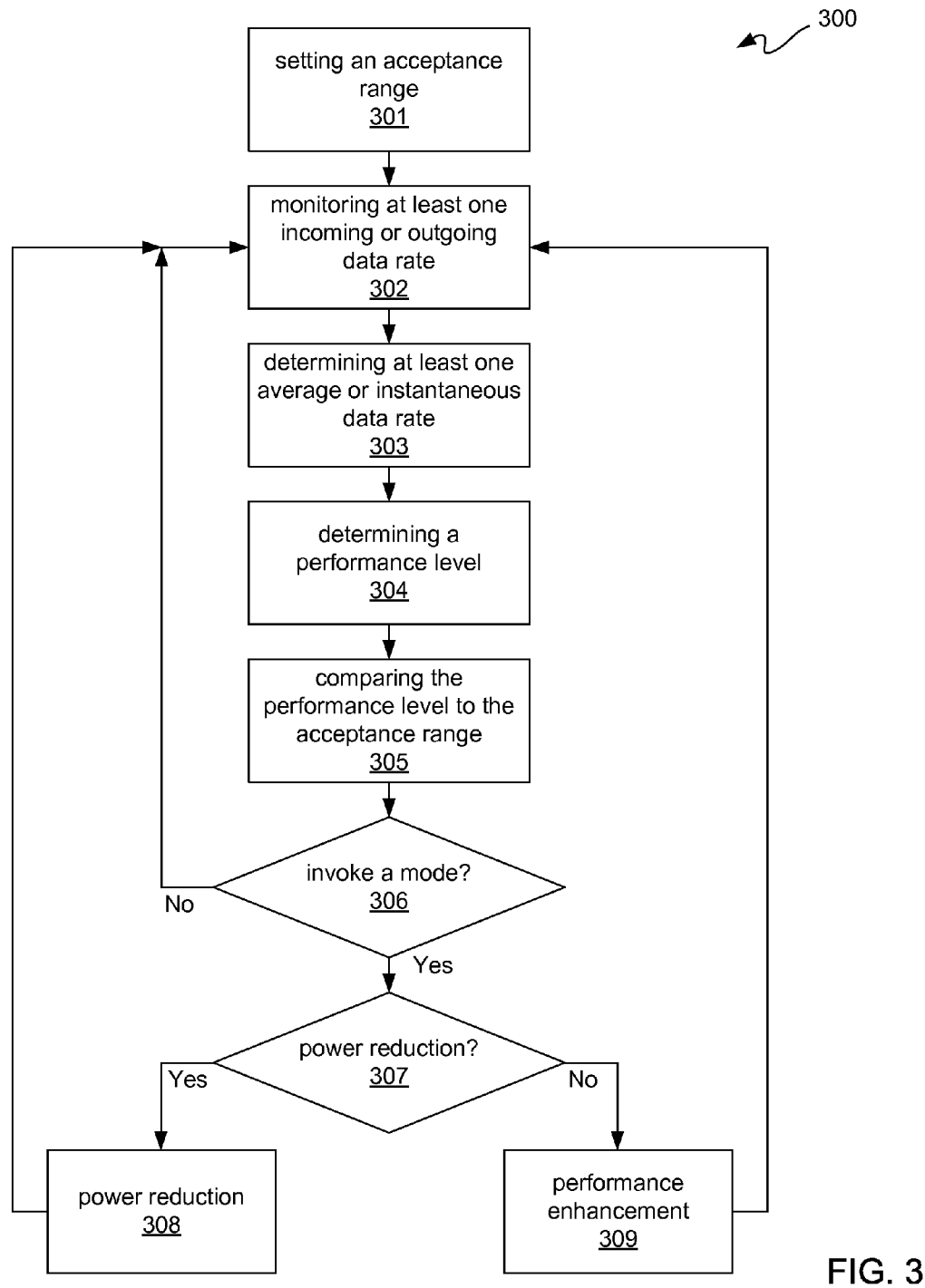
FIG. 3 is a flow diagram depicting an exemplary embodiment of a power conserving/power enhancing flow.

FIG. 3 is a flow diagram depicting an exemplary embodiment of a power conserving/power enhancing flow 300. With simultaneous reference to FIGS. 2 and 3, flow 300 and system 200 are further described.

Flow 300 is initiated at 301 where an acceptance range is set in converter 202 based upon performance levels for an application and within the capability of one or more data processors 206. Again, an acceptance range may be the range from a minimum performance level to a maximum performance level. The minimum performance level may be set to accommodate the lowest incoming rate of data from high-speed serial interfaces 201. For example, when only a single one of high-speed serial interfaces 201 is active, a performance level for data processors 206 capable of timely processing such incoming serial data rate may be used.

For purposes of clarity and not limitation, it is assumed that controller 203 is configured to determine performance level for data processors 206 as a function of an average incoming data rate and not an instantaneous incoming data rate for an application. However, either of such incoming data rates may be used.

Again, such average incoming data rate may be obtained from data analyzer 204, or at least an indication of such rate, such as via a control signal, may be obtained therefrom. In order to clearly describe flow 300, an overview summary of operation is provided. After accessing the acceptance range set in converter 202 at 301, controller 203 compares the performance level determined from the indication of the incoming data rate obtained from data analyzer 204 to the acceptance range. If the current performance level is greater than the maximum performance level of the acceptance range, then a power reduction or conserving mode for data processors 206 may be invoked. If, however, the performance level determined as a function of the incoming average data rate is within the acceptance range, then controller 203 may not do anything other than to allow the status quo to continue. Lastly, if the performance level determined by controller 203 as a function of the average incoming data rate is less than the minimum performance, then a power enhancing mode may be invoked.

The minimum performance level may be set higher than the lowest possible performance level for incoming data rate. In other words, the minimum performance level need not be the lowest possible incoming data rate. However, if the minimum performance level were zero, for example, then a performance enhancing mode may be invoked for any incoming data activity, such as responsive to an instantaneous incoming data rate, up to a maximum performance level.

It has been assumed that performance level was determined by an incoming data rate. However, performance level may be determined by an outgoing data rate from controller 203 to data processors 206. Moreover, performance level may be determined responsive to both the incoming and outgoing data rates with respect to incoming data to converter 202 and outgoing data from controller 203. Thus, a throughput monitor 205 may be coupled to the output of controller 203 to determine the outgoing average data rate or outgoing instantaneous data rate from controller 203. Effectively, this outgoing data rate, which may be a moving average, indicates how well system 200 is performing. Output of throughput monitor 205 may be provided, such as via a control signal, to controller 203 to provide an indication of an output data rate, and thus throughput monitor 205 may be configured like data analyzer 204 with respect to data rate, except rather than processing incoming data, outgoing data is processed. Thus, either throughput monitor 205 or data analyzer 204, or both, is present.

Optionally, throughput monitor 205 may be configured to monitor the performance of the output of data processors 206, for any adjustment of performance level of data processors 206. Thus, throughput monitor 205 may provide moving average or real time feedback signaling to data analyzer 204, or a combination thereof. Data analyzer 204 may evaluate such signaling obtained from throughput monitor 205, as generally indicated by a dashed line for a bus, and evaluate fill level of signaling obtained from converter 202 for providing an instruction to controller 203 to activate/deactivate one or more data processors or throttle up or down frequency of data processors of data processors 206, or a combination thereof. It should be understood a bus may refer to one or more traces or other signal propagation media, one or more signals, or a combination thereof.

It should be appreciated that throughput monitor 205 may report whether performance is meeting a set acceptance range, and thus data analyzer 204 may progressively activate/deactivate or throttle up/down data processors until throughput monitor 205 indicates that system 200 is operating within a set acceptance range but at a power consumption level that is at least closer to optimal.

Furthermore, it should be appreciated that functions of data analyzer 204 and throughput monitor 205 may be implemented in software, hardware, firmware, programmable logic gates, or any combination thereof. Furthermore, it should be appreciated that data analyzer 204 or throughput monitor 205, or both, may be implemented in whole or in part in field programmable logic gates of an FPGA.

In an alternative embodiment, data analyzer 204 may be configured to process both incoming and outgoing data for determining an incoming average data rate and an outgoing average data rate. Thus, throughput monitor 205 may be omitted in such an embodiment, and indications of both incoming and outgoing data rates may be provided from data analyzer 204 to controller 203. In a further alternative to such alternative embodiment, data analyzer 204 may directly control performance level of data processors 206, as generally indicated by a dashed line to indicate a bus from data analyzer 204 to data processors 206. Thus, rather than providing an indication to controller 203 of one or more data rates, data analyzer 204 may obtain the acceptance range from converter 202 and perform the comparison previously described, whether for incoming or outgoing data rates or a combination thereof, and thus increase or slow frequency of operation of one or more data processors of data processors 206 or increase or decrease the number of active data processors of data processors 206, or a combination thereof.

With reference to FIG. 3, at 302, at least one data rate, whether incoming or outgoing, is monitored. For the at least one data rate being monitored, at least one average or instantaneous data rate may be determined at 303.

At 304, a performance level may be determined as a function of the at least one rate identified at 303. Alternatively, at 304, a performance level may be determined as a function of incoming and outgoing data rates identified at 302. For example, incoming data might be buffered and processed after some delay time, "T1." The outgoing data rate might continue to be low for a time period "T1" after the input data rate goes up, and thus the output data rate might continue to be high for a different time period "T2" after the input data rate goes down. In this embodiment, the number of processors allocated is increased when the input data rate increases, and the number of processors allocated is decreased when the output data rate decreases.

At 305, the acceptance range set at 301 may be accessed for comparing the performance level determined at 304 to such acceptance range, whether for incoming or outgoing data rates, or both.

At 306, it may be determined whether a power reduction or a performance enhancement mode, or no mode, is to be invoked. If the performance level determined at 304 is within the acceptance range set at 301 as determined by the comparison at 305, then it may be determined that no mode needs to be invoked at 306, and flow 300 may continue monitoring at 302. If, however, the performance level determined at 304 is not within the acceptance range as determined at the comparison at 305, then either of two modes may be invoked. For purposes of clarity by way of example and not limitation, flow 300 makes a determination as to whether the power reduction mode is to be invoked at 307. If the performance level determined at 304 is above the acceptance range, then power reduction mode is to be invoked, and such power reduction mode is invoked at 308, followed by continued monitoring at 302. If, however, the performance level determined at 304 is below the acceptance range as determined at 305, then a power reduction mode is not to be invoked as determined at 307, and thus a performance enhancement mode is invoked at 309. After invoking the performance enhancement mode at 309, monitoring may continue at 302.

At 307, rather than a power reduction mode, it may alternatively be determined whether a performance enhancement mode is to be invoked, as either the performance enhancement or power reduction mode is invoked if a mode is going to be invoked as part of a cycle of flow 300.

There are various ways of controlling performance level of an array of data processors, such as data processors 206. For example, clock 211 may be gated by controller 203 as applied to one or more of data processors 206 via a bus coupling controller 203 to data processor 206. Gating the clock may be used to either allow the clock to be provided to such data processors or to prevent the clock from being provided to such data processors. When the clock is not provided to such data processors, then such data processors do not operate, and thus performance level of data processors 206 may be reduced. Accordingly, controller 203, or alternatively data analyzer 204, may be configured to gate clock 211 as provided to data processors 206. Alternatively, controller 203 or data analyzer 204 may be configured to power down a portion, such as one or more, of data processors of data processors 206. Another alternative for adjusting performance level of data processors 206 includes adjusting a clock signal, such as clock signal 211, by controller 203 or alternatively by data analyzer 204 to increase or reduce the frequency of such clock signal, where data processors 206 would receive such an adjusted clock signal. In an embodiment where performance level is controlled by reducing frequency of operation, it may be that all data processors in data processors 206 are active however their frequency of operation is either increased or decreased in order to be within an acceptance range.

Still yet another alternative for adjusting performance level of data processors 206 is to reduce the processor utilization level in a shared pool of processors in accordance with queuing theory as is known. Thus, if a subset of data processors of data processors 206 is utilized, such as put in a full rate mode, while a power reduction mode is invoked with another subset of data processors not being utilized, such as put in an idle mode, during such invocation, then level of performance of data processors 206 is adjusted to operate within an acceptance range. Controller 203 of course would only route data to those processors in data processors 206 in the subset being utilized. In such an embodiment, controller 203 partitions data of at least one input data stream to provide partitioned data for distribution to a portion of data processors 206 that are not idled. The number of data partitions does not exceed the number of "available" processors of shared data processors 206. By "available" processors, it is generally meant data processors not in an idle mode.

It has been described above how data may be converted from serial to parallel for processing where performance level may be dynamically adjusted according to the rate at which data is being received. It should be understood that multiple processors may be used for such parallel processing and by clocking various blocks, a pipelined architecture may be implemented. Furthermore, it should be understood that such parallel data processing may be dynamically adjusted for throughput, bandwidth, and speed/performance in a power efficient utilization. In other words, one or more data processors may have their power consumption reduced responsive to a lowered demand for performance, again where such power reduction may be obtained by powering down one or more of data processors 206, disabling a clock to one or more of data processors 206, lowering a clock frequency, invoking a stand-by mode, and so forth. However, it should be appreciated that an acceptable performance level may be maintained even though throughput has been reduced commensurate with a reduction in power consumption.

Thus, by monitoring for example a percentage of data processors used in performing tasks, a multi-processor system may be dynamically scaled back. In other words, the number of data processors utilized for the frequency of operation may be reduced, to obtain a throughput of such system within an acceptable range. It is well known that power consumption generally varies linearly with the frequency of operation and linearly with respect to the square of the voltage, and thus a reduction in voltage may yield more power savings. It should also be understood that power may be reduced as described herein in a variety of embodiments, and this variety allows for a wider range of applicability for power reduction as described herein, including those systems where it may not be practical or feasible to reduce voltage for example.

Thus, it should be appreciated that a system designer may have an optimal implementation strategy for meeting system performance with the advantage of dynamically maintaining power consumption at a significantly reduced or optimally reduced power consumption level.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method of operating an integrated circuit having a plurality of processors, the method comprising:
storing an input data stream received from a plurality of serial interfaces in a buffer memory, and converting the input data stream from a serial format to a parallel format;
determining an input data rate that is a collective data rate of the input data stream received from the plurality of serial interfaces and stored in the buffer memory;
generating an input rate control signal responsive to the serial format input data stream, the input rate control signal indicative of the input data rate;
determining an output data rate indicative of an outgoing data rate of the parallel format input data stream between the buffer memory and at least a portion of the plurality of processors;
generating an output rate control signal responsive to and indicative of the output data rate;
determining an average input data rate from the input rate control signal;
determining an average output data rate from the output rate control signal;
determining a current performance level as a function of the average input data rate and the average output data rate;
partitioning the parallel format input data stream in response to the current performance level;
distributing the partitioned parallel format input data stream to the portion of the plurality of processors; and
operating the plurality of processors in a plurality of modes responsive to the current performance level.

2. The method according to claim 1, wherein the plurality of modes include a first mode and a second mode, the method further comprising:
operating a subset of the plurality of processors at a full rate responsive to the first mode; and
operating at least one processor of the plurality of processors in an idle mode responsive to the second mode.

3. The method according to claim 2, wherein the operating of the at least one processor in the idle mode includes gating a clock input.

4. The method according to claim 1, wherein the operating of the plurality of processors includes dynamically adjusting performance of the plurality of processors.

5. The method according to claim 1, wherein the generating of the output rate control signal is responsive to a predetermined configuration of the integrated circuit.

6. The method according to claim 1, wherein the plurality of processors are instantiated in programmable logic fabric.

7. The method according to claim 1, wherein the operating of the plurality of processors includes:
operating a first portion of the plurality of processors for processing the parallel format input data stream; and
operating a second portion of the plurality of processors in an idle mode.

8. A multi-processor system, comprising:
a plurality of processors;
a plurality of serial interfaces;
a first circuit comprising a converter and buffer memory circuit coupled to the plurality of serial interfaces, wherein the first circuit is configured and arranged to store an input data stream received from the plurality of serial interfaces, and convert the input data stream from a serial format to a parallel format;
a second circuit coupled to the plurality of processors;
an analyzer circuit coupled to the converter and buffer memory circuit and the second circuit;
wherein the analyzer circuit is configured to determine an average input data rate based on a collective data rate of the serial format input data stream received from the plurality of serial interfaces and input to the converter and buffer memory circuit; and
a third circuit coupled to an output of the second circuit and to the analyzer circuit, wherein the third circuit is configured to determine an average output data rate of the parallel format input data stream from the second circuit to at least a portion of the plurality of processors;
wherein the analyzer circuit is configured to determine a current performance level as a function of the average input data rate and the average output data rate and generate a control signal;
wherein the second circuit is coupled to receive data from the converter and buffer memory circuit and the control signal from the analyzer circuit; and
wherein the second circuit is configured to partition the parallel format input data stream and distribute the partitioned parallel format input data stream to a first portion of the plurality of processors responsive to the control signal and is configurable to operate the plurality of processors in a first mode and a second mode in response to the control signal.

9. The multi-processor system according to claim 8, wherein:
the second circuit includes a configurable interface coupled to the plurality of processors;
the configurable interface distributes the partitioned parallel format input data stream to the first portion of the plurality of processors responsive to the control signal; and
a second portion of the plurality of processors is in an idle mode.

10. The multi-processor system according to claim 8, wherein:
the first mode operates the first portion of the plurality of processors at full rate; and
the second mode operates at least one processor of the plurality of processors in an idle mode.

11. The multi-processor system according to claim 10, wherein the plurality of processors are a plurality of configurable processors instantiated in programmable logic fabric.

12. The multi-processor system according to claim 10, wherein operating the at least one processor in the second mode includes reducing frequency rate.

13. The multi-processor system according to claim 10, wherein operating the at least one processor in the second mode includes gating a clock input.

14. The multi-processor system according to claim 10, wherein operating the at least one processor in the second mode includes powering off a portion of the at least one processor.

15. An integrated circuit, comprising:
a plurality of shared processors;
a plurality of serial interfaces;

a controller circuit having outputs coupled to the plurality of shared processors;

a converter circuit and buffer memory circuit coupled to the plurality of serial interfaces, wherein the converter circuit is configured and arranged to receive an input data stream from the plurality of serial interfaces and convert the input data stream from a serial format to a parallel format and store the parallel format input data stream in the buffer memory circuit, the converter circuit and buffer memory circuit coupled to the controller circuit and configured to provide the parallel format input data stream to the controller circuit;

an input data analyzer circuit having an input coupled to the converter circuit and buffer memory circuit and an output coupled to the controller circuit, wherein the input data analyzer is configured to determine an average input data rate based on a collective data rate of the serial format input data stream received from the plurality of serial interfaces and input to the converter circuit and buffer memory circuit; and an output data analyzer circuit coupled to the outputs of the controller circuit and configured to provide a control signal to the input data analyzer circuit and the controller circuit, wherein the output analyzer circuit is configured to determine an average output data rate of the parallel format input data stream from the controller circuit to the plurality of shared processors;

wherein the controller circuit is configured to partition the output of the converter circuit and buffer memory circuit responsive to the output of the input data analyzer circuit;

wherein a number of data partitions of the partitioned output of the controller circuit does not exceed a number of available processors of the plurality of shared processors; and wherein the controller circuit is configured to determine a performance level from the average input data rate and the average output data rate and partition and operate the plurality of shared processors in response to the determined performance level.

16. The integrated circuit according to claim 15, wherein:

the controller circuit is configurable to operate the plurality of shared processors in a first mode and a second mode in response to the output of the input data analyzer circuit;

the first mode is for operating a first portion of the plurality of shared processors at full rate; and the second mode is for operating at least one processor of the plurality of shared processors in an idle mode.

17. The integrated circuit according to claim 16, wherein the operating of the at least one processor in the second mode includes gating a clock input.

* * * * *